J. SEILER.
Coupling-Brace for Mirror-Standard.
No. 221,109. Patented Oct. 28, 1879.
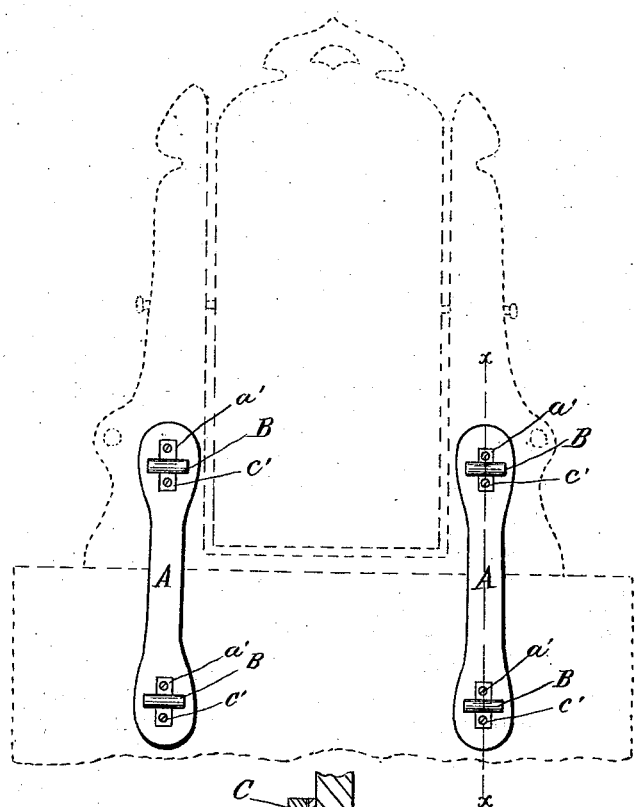
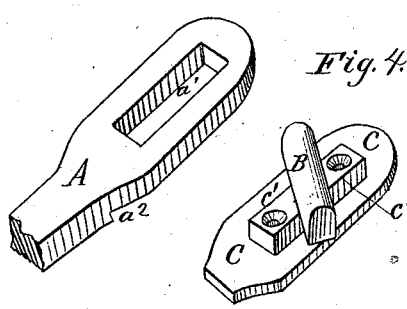
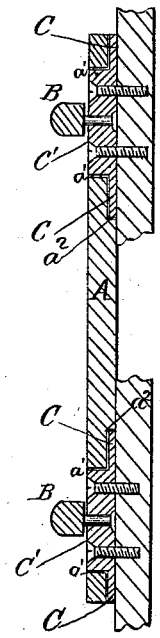
WITNESSES:
Henry N. Miller
C. Sedgwick
INVENTOR:
J. Seiler
BY Munn & Co.
ATTORNEYS.

UNITED STATES PATENT OFFICE.

JOSEPH SEILER, OF NORWALK, CONNECTICUT.

IMPROVEMENT IN COUPLING-BRACES FOR MIRROR-STANDARDS.

Specification forming part of Letters Patent No. 221,109, dated October 28, 1879; application filed May 17, 1879.

*To all whom it may concern:*

Be it known that I, JOSEPH SEILER, of Norwalk, in the county of Fairfield and State of Connecticut, have invented a new and useful Improvement in Coupling-Braces for Mirror-Standards, of which the following is a specification.

Figure 1 is a view of two of my improved braces, illustrating their use. Fig. 2 is a longitudinal section taken through the line $x$ $x$, Fig. 1. Fig. 3 is a detail perspective view of one end of the bar. Fig. 4 is a detail perspective view of one of the buttons and its base.

Similar letters of reference indicate corresponding parts.

The object of this invention is to furnish an improved device for connecting the mirror standards or supports with a bureau, in such a way that they can be easily attached and detached, as required.

The invention consists in coupling - braces formed of the bars having slots in each end, the pivoted buttons, and the plates provided with the projections to fit into the slots of the said bar for securing mirror - standards, as hereinafter fully described.

A is the brace-bar, which is made of convenient length, and of such a width and thickness as will give it the necessary strength.

In the ends of the bar A are formed short slots $a'$, to receive the buttons B and projections $c'$. The buttons B are made of such a length and thickness as to readily pass through the slots of the bar A, and are pivoted at their centers to projections $c'$, formed upon the plates C.

The projections $c'$ are made of such a length and breadth as to fit into the slots $a'$, and of such a height that their outer surfaces may be flush with the outer surface of the bar A.

The inner side of the end parts of the bar A have recesses $a^2$ formed in them to receive the plates C; or the said plates may be let into the backs of the standards and bureau.

With this construction, by turning the buttons B into line with the slots $a'$ the bars A may be readily detached and attached. When the bars A have been placed upon the projections $c'$ of the plates C, and the buttons B turned one-quarter around, or across the bars A, the said bars will be firmly secured in place. This device allows the mirror standards or supports to be readily detached from and attached to the bureau, and will hold them securely when attached.

Having thus described my invention, I claim as new and desire to secure by Letters Patent—

Coupling-braces formed of the bars A, having slots $a'$ in each end, the pivoted buttons B, and the plates C, provided with the projections $c'$, to fit into the slots $a'$ of the bars A, for securing mirror-standards to bureaus, substantially as herein shown and described.

JOSEPH SEILER.

Witnesses:
GEORGE WILLIAM PARKER,
PATRICK HENRY DWYER.